(12) United States Patent
Newsome

(10) Patent No.: US 10,473,277 B1
(45) Date of Patent: Nov. 12, 2019

(54) LIGHTED WIRE FISHING DEVICE

(71) Applicant: Frank Newsome, Grandbury, TX (US)

(72) Inventor: Frank Newsome, Grandbury, TX (US)

( * ) Notice: Subject to any disclaimer, the term of this patent is extended or adjusted under 35 U.S.C. 154(b) by 0 days.

(21) Appl. No.: 16/111,453

(22) Filed: Aug. 24, 2018

(51) Int. Cl.
| | | |
|---|---|---|
| *F21V 23/06* | (2006.01) | |
| *F21L 4/02* | (2006.01) | |
| *F21V 23/04* | (2006.01) | |
| *F21Y 107/00* | (2016.01) | |
| *F21Y 115/10* | (2016.01) | |

(52) U.S. Cl.
CPC ............ *F21L 4/02* (2013.01); *F21V 23/0414* (2013.01); *F21V 23/06* (2013.01); *F21Y 2107/00* (2016.08); *F21Y 2115/10* (2016.08)

(58) Field of Classification Search
CPC ........ F21L 4/02; F21V 23/06; F21V 23/0414; F21Y 2115/10; F21Y 2107/00
See application file for complete search history.

(56) References Cited

U.S. PATENT DOCUMENTS

| | | | |
|---|---|---|---|
| 5,149,282 A * | 9/1992 | Donato | .................... F21V 15/04 248/160 |
| 5,152,598 A | 10/1992 | Schaffer | |
| 5,820,249 A | 10/1998 | Walsten | |
| D403,932 S | 1/1999 | Klamm | |
| 6,293,519 B1 | 9/2001 | Farretta | |
| 6,972,377 B2 | 12/2005 | Sawyer | |
| 7,494,244 B1 * | 2/2009 | Van Diep | ................... F21S 2/00 362/227 |
| 8,033,678 B2 | 10/2011 | Patterson | |
| 9,062,834 B2 | 6/2015 | Rennecker | |
| 2013/0155668 A1 * | 6/2013 | Rennecker | ................ F21L 4/04 362/191 |
| 2015/0292721 A1 * | 10/2015 | Lesmeister | ............. F21V 21/32 362/555 |
| 2016/0025278 A1 * | 1/2016 | Camarota | ................. F21V 5/04 362/219 |
| 2016/0341408 A1 * | 11/2016 | Altamura | ............... H01L 33/486 |
| 2018/0112837 A1 * | 4/2018 | Sadwick | ................... F21K 9/27 |
| 2018/0132555 A1 * | 5/2018 | Gonzalez | ................ A45F 5/021 |

FOREIGN PATENT DOCUMENTS

WO    WO2004002863    1/2004

* cited by examiner

*Primary Examiner* — Donald L Raleigh

(57) ABSTRACT

A lighted wire fishing device for installing wire includes a rod that is resilient. The rod is semiflexible so that the rod is configured to be used to fish a wire through a structural element of a structure. A housing is coupled to and extends from a first end of the rod. The housing defines an interior space. A power module is coupled to the housing and is positioned in the interior space. A plurality of bulbs is coupled to the rod and extends from proximate to the first end to proximate to a second end of the rod. The plurality of bulbs is operationally coupled to the power module. The power module is positioned to selectively power the bulbs to illuminate an area proximate to the rod so that the rod and the wire are visible to a user.

14 Claims, 3 Drawing Sheets

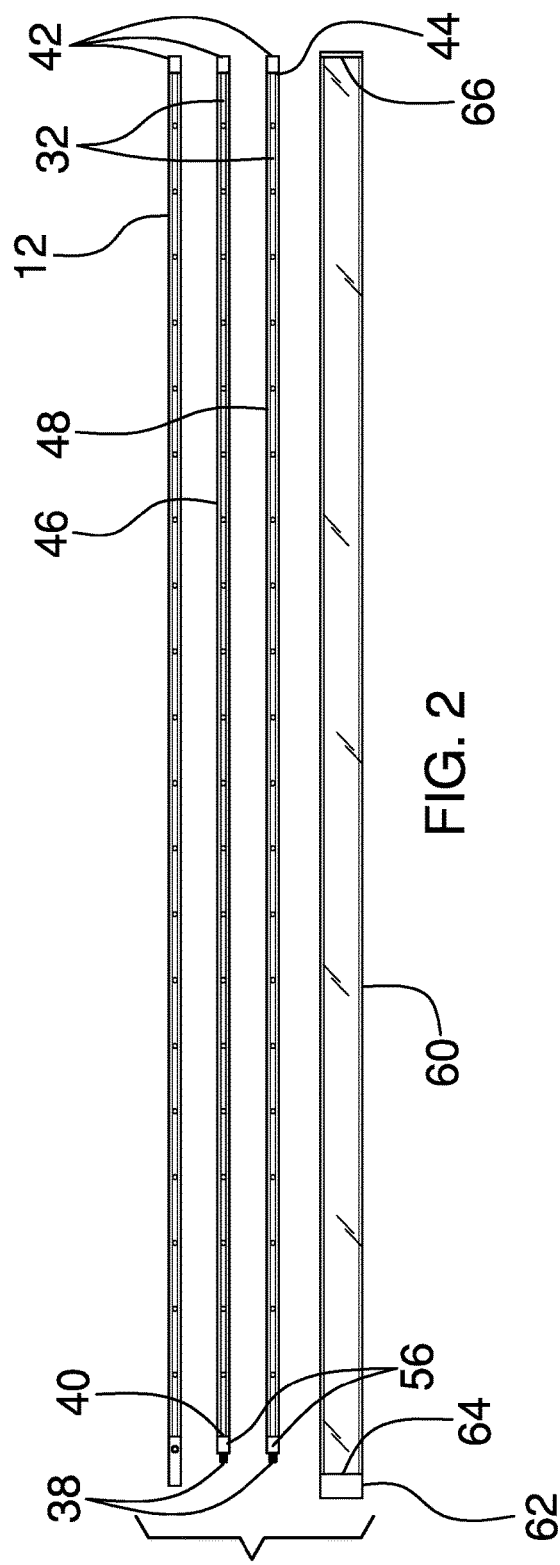
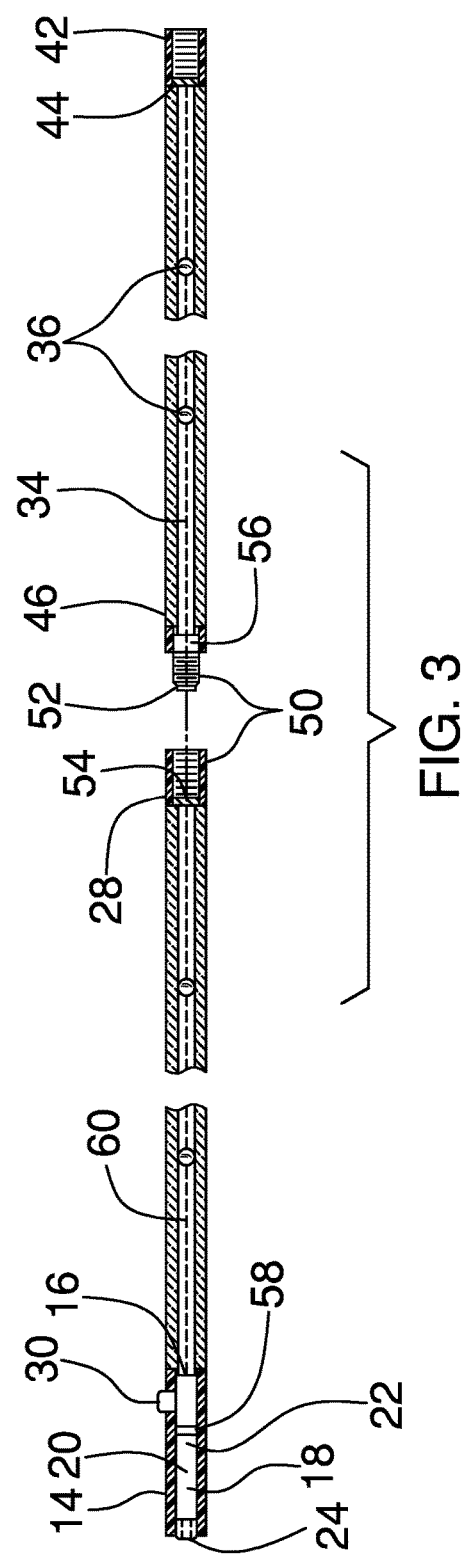

LIGHTED WIRE FISHING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to wire fishing devices and more particularly pertains to a new wire fishing device for installing wire.

BRIEF SUMMARY OF THE INVENTION

An embodiment of the disclosure meets the needs presented above by generally comprising a rod that is resilient. The rod is semiflexible so that the rod is configured to be used to fish a wire through a structural element of a structure. A housing is coupled to and extends from a first end of the rod. The housing defines an interior space. A power module is coupled to the housing and is positioned in the interior space. A plurality of bulbs is coupled to the rod and extends from proximate to the first end to proximate to a second end of the rod. The plurality of bulbs is operationally coupled to the power module. The power module is positioned to selectively power the bulbs to illuminate an area proximate to the rod so that the rod and the wire are visible to a user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a top view of an embodiment of the disclosure.

FIG. 3 is a cross-sectional view of an embodiment of the disclosure.

DETAILED DESCRIPTION OF THE INVENTION

Figure 1:
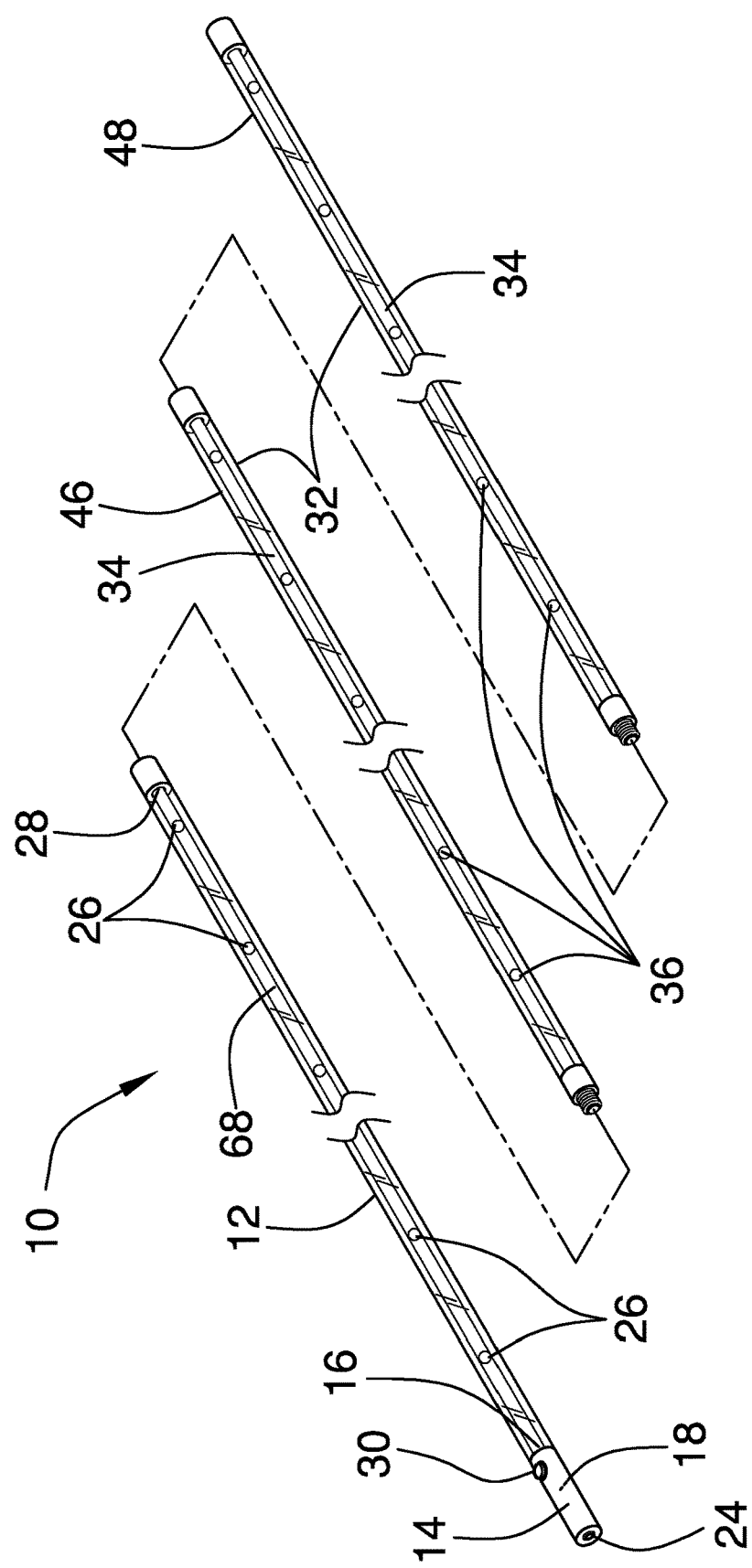
FIG. 1 is an isometric perspective view of a lighted wire fishing device according to an embodiment of the disclosure.
Figure 4:
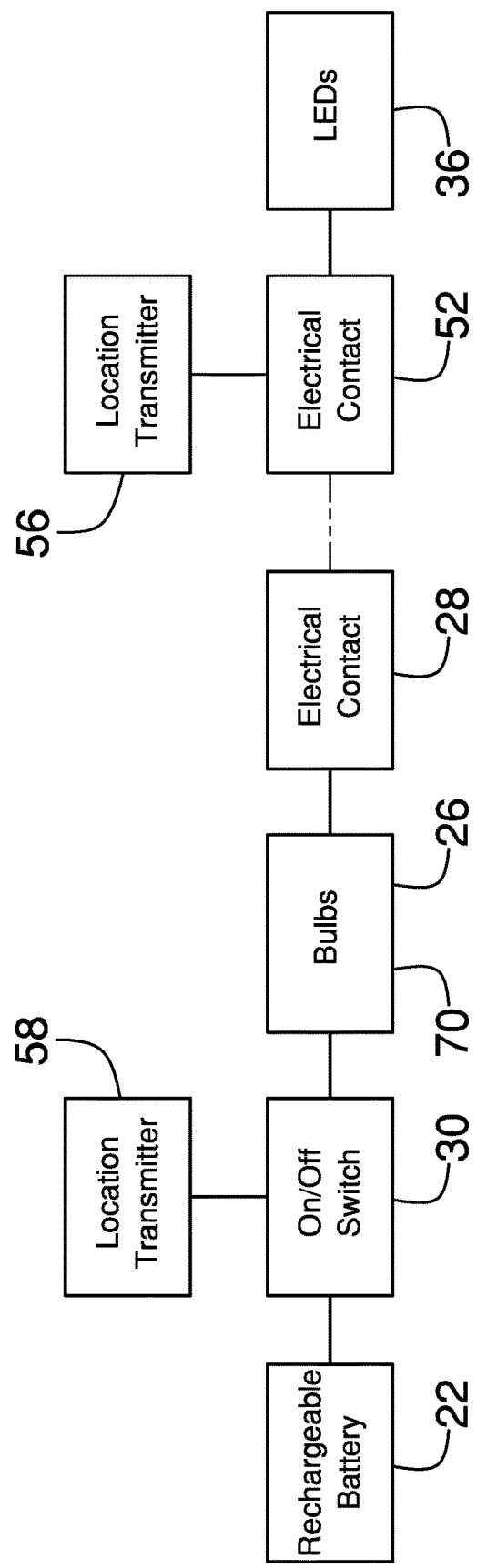
FIG. 4 is a block diagram of an embodiment of the disclosure.

With reference now to the drawings, and in particular to FIGS. 1 through 4 thereof, a new wire fishing device embodying the principles and concepts of an embodiment of the disclosure and generally designated by the reference numeral 10 will be described.

As best illustrated in FIGS. 1 through 4, the lighted wire fishing device 10 generally comprises a rod 12 that is resilient. The rod 12 is semiflexible so that the rod 12 is configured to be used to fish a wire through a structural element of a structure, such as a wall and a ceiling. The rod 12 comprises fiberglass or the like. The rod 12 is substantially transparent. The rod 12 is tubular and defines a channel 68.

A housing 14 is coupled to and extends from a first end 16 of the rod 12, as shown in FIG. 1. The housing 14 defines an interior space 18, is tubularly shaped, and is substantially circumferentially equivalent to the rod 12.

A power module 20 is coupled to the housing 14 and is positioned in the interior space 18, as shown in FIG. 3. The power module 20 comprises a battery 22. The battery 22 is rechargeable. A port 24 is coupled to the housing 14. The port 24 is operationally coupled to the battery 22. The port 24 is configured to couple to a source of direct current, such as to a cigarette lighter receptacle, so that the port 24 is configured to supply the direct current to the battery 22 to charge the battery 22.

A plurality of bulbs 26 is coupled to the rod 12 and extends from proximate to the first end 16 to proximate to a second end 28 of the rod 12. The bulbs 26 are positioned in the channel 68. Each bulb 26 comprises a light emitting diode 70. The plurality of bulbs 26 is operationally coupled to the power module 20 so that the power module 20 is positioned to selectively power the bulbs 26 to illuminate an area proximate to the rod 12 so that the rod 12 and the wire are visible to the user.

A switch 30 is coupled to the housing 14. The switch 30 is push-button type, as shown in FIG. 3. The switch 30 is operationally coupled to the power module 20 and the plurality of bulbs 26. The switch 30 is positioned to selectively couple the plurality of bulbs 26 to the power module 20 to power the bulbs 26 to illuminate the area proximate to the rod 12 so that the rod 12 and the wire are visible to the user.

The device 10 also comprises a plurality of extension rods 32, as shown in FIG. 2. The plurality of extension rods 32 comprises three extension rods 32. The extension rods 32 are tubular so that each extension rod 32 defines an internal space 34. The extension rods 32 are substantially circumferentially equivalent to the rod 12. The extension rods 32 comprise fiberglass or the like. The extension rods 32 are substantially transparent.

Each of a plurality of sets of light emitting diodes 36 is coupled to a respective extension rod 32 and is positioned in the internal space 34 of the respective extension rod 32.

Each of a plurality of first connectors 38 is coupled to a first endpoint 40 of a respective extension rod 32. Each of a plurality of second connectors 42 is coupled to a second endpoint 44 of a respective extension rod 32. The plurality of second connectors 42 also comprises a second connector 42 that is coupled to the second end 28 of the rod 12. The second connectors 42 are complementary to the first connectors 38.

The second connector 42 that is coupled to the rod 12 is positioned to couple to the first connector 38 of a first extension rod 46 to couple the first extension rod 46 to the rod 12, positioning the second connector 42 of the first extension rod 46 to couple to the first connector 38 of a second extension rod 48. As such, the plurality of extension rods 32 is sequentially and linearly couplable to the rod 12. Each second connector 42 and a respective first connector 38 comprise a threaded barrel-socket coupler 50.

Each of a plurality of first contacts 52 is coupled to a respective first connector 38 and is operationally coupled to an associated set of light emitting diodes 36. Each of a plurality of second contacts 54 is coupled to a respective second connector 42 and is operationally coupled to an associated set of light emitting diodes 36. The second contact 54 is positioned to abut a respective first contact 52 to operationally couple the associated set of light emitting diodes 36 to the power module 20, as shown in FIG. 3.

The device 10 also comprises a plurality of transmitters 56. Each transmitter 56 is coupled to a respective extension rod 32 proximate to the first connector 38, as shown in FIG. 3. The transmitter 56 is operationally coupled to the first contact 52 of the respective extension rod 32 so that the transmitter 56 is positioned to operationally couple to the power module 20. The transmitter 56 is positioned to emit a signal so that the respective extension rod 32 is configured to is located. Should an extension rod 32 be lost in the structure, the user would be positioned to use a locating device, obvious to a person of ordinary skill in the art of locating devices, to detect the signal and the extension rod 32.

A rod transmitter 58 is coupled to the housing 14 and is positioned in the interior space 18, as shown in FIG. 3. The rod transmitter 58 is operationally coupled to the power module 20. The rod transmitter 58 is positioned to emit the signal so that the rod 12 is configured to be located. Should the rod 12 be lost in the structure, the user would be positioned to use the locator to detect the signal and the rod 12.

The device 10 also comprises a tube 60 and a cap 62, as shown in FIG. 2. The tube 60 has a top 64 and a bottom 66. The bottom 66 is closed. The top 64 is open. The top 64 is configured to insert the rod 12 and the plurality of extension rods 32 into the tube 60. The cap 62 is complementary to the top of the tube 60 and is configured to couple to the tube 60 to close the top 64.

In use, the user couples a required number of extension rods 32 to the rod 12 to have sufficient reach through the wall or the ceiling. The wire is coupled to the second end 28 of the rod 12, or to the second endpoint 44 of the extension rod 32 that is distal from the housing 14 if one or more extension rods 32 is used. The user is positioned to fish the wire through the structural element. The bulbs 26 are selectively illuminated to assist the user in locating the rod 12, the extension rods 32, and the wire.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lighted wire fishing device comprising:
   a rod, said rod being resilient wherein said rod is semi-flexible such that said rod is configured for fishing a wire through a structural element of a structure;
   a housing coupled to and extending from a first end of said rod, said housing defining an interior space;
   a power module coupled to said housing and positioned in said interior space; and
   a plurality of bulbs coupled to said rod and extending from proximate to said first end to proximate to a second end of said rod, said plurality of bulbs being operationally coupled to said power module wherein said power module is positioned for selectively powering said bulbs for illuminating an area proximate to said rod; and
   a rod transmitter coupled to said housing and positioned in said interior space, said rod transmitter being operationally coupled to said power module wherein said rod transmitter is positioned for emitting a signal such that said rod is configured for being located.

2. The device of claim 1, further including said rod comprising fiberglass.

3. The device of claim 1, further including said housing being tubularly shaped, said housing being substantially circumferentially equivalent to said rod.

4. The device of claim 1, further including said power module comprising a battery.

5. The device of claim 4, further including comprising:
   said battery being rechargeable; and
   a port coupled to said housing, said port being operationally coupled to said battery, said port being configured for coupling to a source of direct current wherein said port is configured for supplying the direct current to said battery for charging said battery.

6. The device of claim 1, further including each said bulb comprising a light emitting diode.

7. The device of claim 6, further including said rod being tubular defining a channel, said rod being substantially transparent, said bulbs being positioned in said channel.

8. The device of claim 1, further including a switch coupled to said housing, said switch being operationally coupled to said power module and said plurality of bulbs wherein said switch is positioned for selectively coupling said plurality of bulbs to said power module for powering said bulbs for illuminating the area proximate to said rod.

9. The device of claim 8, further including said switch being push-button type.

10. The device of claim 7, further comprising:
a plurality of extension rods, said extension rods being tubular such that each said extension rod defines an internal space, said extension rods being substantially circumferentially equivalent to said rod, said extension rods comprising fiberglass, said extension rods being substantially transparent;
a plurality of sets of light emitting diodes, each said set of light emitting diodes being coupled to a respective said extension rod and positioned in said internal space of said respective said extension rod;
a plurality of first connectors, each said first connector being coupled to a first endpoint of a respective said extension rod;
a plurality of second connectors, each said second connector being coupled to a second endpoint of a respective said extension rod, said plurality of second connectors comprising a second connector coupled to said second end of said rod, said second connectors being complementary to said first connectors wherein said second connector coupled to said rod is positioned for coupling to said first connector of a first said extension rod for coupling said first said extension rod to said rod, positioning said second connector of said first said extension rod for coupling to said first connector of a second said extension rod such that said plurality of extension rods is sequentially linearly couplable to said rod;
a plurality of first contacts, each said first contact being coupled to a respective said first connector and operationally coupled to an associated said set of light emitting diodes; and
a plurality of second contacts, each said second contact being coupled to a respective said second connector and operationally coupled to an associated said set of light emitting diodes where said second contact is positioned for abutting a respective said first contact for operationally coupling said associated said set of light emitting diodes to said power module.

11. The device of claim 10, further including said plurality of extension rods comprising two said extension rods.

12. The device of claim 10, further including each said second connector and a respective said first connector comprising a threaded barrel-socket coupler.

13. The device of claim 1, further comprising:
said rod comprising fiberglass, said rod being tubular defining a channel, said rod being substantially transparent;
said housing being tubularly shaped, said housing being substantially circumferentially equivalent to said rod;
said power module comprising a battery, said battery being rechargeable;
a port coupled to said housing, said port being operationally coupled to said battery, said port being configured for coupling to a source of direct current wherein said port is configured for supplying the direct current to said battery for charging said battery;
each said bulb comprising a light emitting diode, said bulbs being positioned in said channel;
a switch coupled to said housing, said switch being operationally coupled to said power module and said plurality of bulbs wherein said switch is positioned for selectively coupling said plurality of bulbs to said power module for powering said bulbs for illuminating the area proximate to said rod, said switch being push-button type;
a plurality of extension rods, said extension rods being tubular such that each said extension rod defines an internal space, said extension rods being substantially circumferentially equivalent to said rod, said extension rods comprising fiberglass, said extension rods being substantially transparent, said plurality of extension rods comprising two said extension rods;
a plurality of sets of light emitting diodes, each said set of light emitting diodes being coupled to a respective said extension rod and positioned in said internal space of said respective said extension rod;
a plurality of first connectors, each said first connector being coupled to a first endpoint of a respective said extension rod;
a plurality of second connectors, each said second connector being coupled to a second endpoint of a respective said extension rod, said plurality of second connectors comprising a second connector coupled to said second end of said rod, said second connectors being complementary to said first connectors wherein said second connector coupled to said rod is positioned for coupling to said first connector of a first said extension rod for coupling said first said extension rod to said rod, positioning said second connector of said first said extension rod for coupling to said first connector of a second said extension rod such that said plurality of extension rods is sequentially linearly couplable to said rod, each said second connector and a respective said first connector comprising a threaded barrel-socket coupler;
a plurality of first contacts, each said first contact being coupled to a respective said first connector and operationally coupled to an associated said set of light emitting diodes;
a plurality of second contacts, each said second contact being coupled to a respective said second connector and operationally coupled to an associated said set of light emitting diodes where said second contact is positioned for abutting a respective said first contact for operationally coupling said associated said set of light emitting diodes to said power module;
a plurality of transmitters, each said transmitter being coupled to a respective said extension rod proximate to said first connector, said transmitter being operationally coupled to said first contact of said respective said extension rod such that said transmitter is positioned for operationally coupling to said power module wherein said transmitter is positioned for emitting a signal such that said respective said extension rod is configured for being located;
a tube having a top and a bottom, said bottom being closed, said top being open wherein said top is configured for inserting said rod and said plurality of extension rods into said tube; and a cap complementary to said top of said tube, said top being configured for coupling to said tube for closing said top.

14. A lighted wire fishing device comprising:

a rod, said rod being resilient wherein said rod is semi-flexible such that said rod is configured for fishing a wire through a structural element of a structure, said rod being tubular defining a channel, said rod being substantially transparent;

a housing coupled to and extending from a first end of said rod, said housing defining an interior space;

a power module coupled to said housing and positioned in said interior space;

a plurality of bulbs coupled to said rod and extending from proximate to said first end to proximate to a second end of said rod, said plurality of bulbs being operationally coupled to said power module wherein said power module is positioned for selectively powering said bulbs for illuminating an area proximate to said rod, each said bulb comprising a light emitting diode, said bulbs being positioned in said channel;

a plurality of extension rods, said extension rods being tubular such that each said extension rod defines an internal space, said extension rods being substantially circumferentially equivalent to said rod, said extension rods comprising fiberglass, said extension rods being substantially transparent;

a plurality of sets of light emitting diodes, each said set of light emitting diodes being coupled to a respective said extension rod and positioned in said internal space of said respective said extension rod;

a plurality of first connectors, each said first connector being coupled to a first endpoint of a respective said extension rod;

a plurality of second connectors, each said second connector being coupled to a second endpoint of a respective said extension rod, said plurality of second connectors comprising a second connector coupled to said second end of said rod, said second connectors being complementary to said first connectors wherein said second connector coupled to said rod is positioned for coupling to said first connector of a first said extension rod for coupling said first said extension rod to said rod, positioning said second connector of said first said extension rod for coupling to said first connector of a second said extension rod such that said plurality of extension rods is sequentially linearly couplable to said rod;

a plurality of first contacts, each said first contact being coupled to a respective said first connector and operationally coupled to an associated said set of light emitting diodes;

a plurality of second contacts, each said second contact being coupled to a respective said second connector and operationally coupled to an associated said set of light emitting diodes where said second contact is positioned for abutting a respective said first contact for operationally coupling said associated said set of light emitting diodes to said power module; and a plurality of transmitters, each said transmitter being coupled to a respective said extension rod proximate to said first connector, said transmitter being operationally coupled to said first contact of said respective said extension rod such that said transmitter is positioned for operationally coupling to said power module wherein said transmitter is positioned for emitting a signal such that said respective said extension rod is configured for being located.

* * * * *